Figure 1:
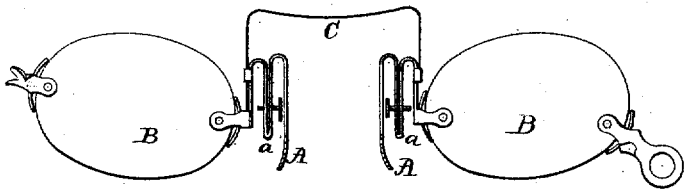

I. ALEXANDER.

EYE-GLASSES.

No. 7,337. Reissued Oct. 3, 1876.

*Witnesses:*

A G Ruan

J. E. Padgett

*Inventor:*

Isaac Alexander

N. PETERS, PHOTO-LITHOGRAPHER, WASHINGTON, D. C.

UNITED STATES PATENT OFFICE.

ISAAC ALEXANDER, OF WASHINGTON, DISTRICT OF COLUMBIA.

IMPROVEMENT IN EYEGLASSES.

Specification forming part of Letters Patent No. 174,753, dated March 14, 1876; reissue No. 7,337, dated October 3, 1876; application filed September 9, 1876.

*To all whom it may concern:*

Be it known that I, ISAAC ALEXANDER, of the city of Washington, in the county of Washington and District of Columbia, have invented certain new and useful Improvements in Eyeglasses, of which the following is a specification, reference being had to the accompanying drawings, making part of the same.

Great difficulty is experienced by many in obtaining eyeglasses which at the same time easily fit the nose and sit firmly thereon, so that they are not thrown off by any jostling or moving of the head. This arises from the fact that the frames are made by hand or machinery, and sold to the retailer in lots, of various sizes, to be sure, but among those of a certain size no allowance is made for the varying sizes and shapes of the human nose.

One object of my invention is to remedy this difficulty by making the nose-springs, which support the glasses upon the nose, adjustable in relation to each other, and to lenses or lens-frames, so that they may be readily adjusted to suit the nose of the wearer.

Another object of my invention is to construct or connect a pair of eyeglasses that when in use they will be in a line straight across the face, like the ordinary spectacles, so that the frame or margin of the lens will in no way obstruct the sight.

To accomplish these ends my invention consists in so constructing and arranging the nose or supporting springs that they shall be adjustable to or from each other, so that the space between them may be increased or diminished, as is more fully hereinafter set forth and claimed.

In the drawings forming part of this specification, I have shown what appears to me to be the best method of carrying my invention into effect, in which—

Figure 2:
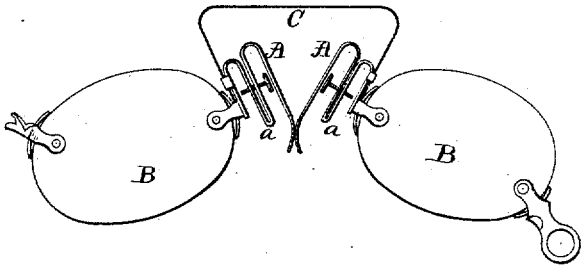
Figure 3:
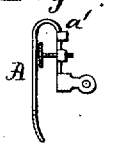
Figure 4:
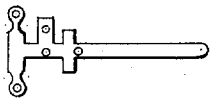
Figure 5:
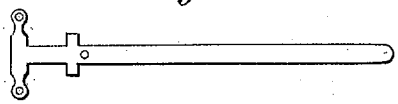

Figure 1 represents a plan or front view of the glasses in the position they will stand in relation to each other when upon the face; Fig. 2, a similar view, showing the position they assume when removed from the face; Fig. 3, a modification of the adjustable spring; Fig. 4, a plan of a piece of metal from which the modified form of spring shown in Fig. 3 may be made; and Fig. 5 a plan from which the spring *a*, shown in Figs. 1 and 2, may be made from a single piece of metal, if desired.

I construct a spring, A, of the form shown in the drawings, having a set-screw, *b*, passing through the portion *a* thereof, so that by turning it either one way or the other, (to the right or left,) it will either separate or allow the branches of the springs to approach each other. This spring may be attached to the lens itself, as shown, or to the frame of a lens, in any suitable manner. To each lens B I have shown one of my improved springs attached, and the two springs connected by a spring, C, of the form shown.

Instead of the springs A A having the returned or reversed part *a a*, as in Figs. 1 and 2, such portion may be dispensed with, and the set-screw *b* take into a metal part, *a'*, attached directly to the lens or lens-frame, as shown in Fig. 3.

Although I have shown the spring A as connected with each lens of a pair of eyeglasses, I have found that one will answer.

The glasses may be folded and locked in the ordinary manner.

It will be observed that the springs A A *a* C, when connected, form an adjustable spring-clamp, for holding the glasses secured thereto to the face.

It is evident that, if eyeglasses be provided with nose-spring embodying the principle of my invention, viz., adjustable to or from each other, that the space between them may be readily varied, and they accurately adjusted to sit firmly and easily upon the nose, irrespective of its size or shape.

It is also evident that many other forms of device may be arranged to carry my invention into effect without departing from its principle.

What I claim as my invention, and desire to secure by Letters Patent, is—

1. The combination, with nose or supporting springs of eyeglasses, of means for adjusting the springs to or from each other, so as to vary the distance between them, substantially as set forth.

2. An eyeglass having its nose-springs or spring-clamps adjusted to or from each other, substantially as set forth.

3. The spring-clamp for eyeglasses, made adjustable by a set-screw, substantially as and for the purpose set forth.

4. The spring A for eyeglass-clamps, made adjustable, substantially as shown and described.

In testimony whereof I have hereunto subscribed my name.

ISAAC ALEXANDER.

In the presence of—
A. G. RIDDLE,
J. E. PADGETT.